United States Patent Office 2,913,465
Patented Nov. 17, 1959

2,913,465

AMINE SALTS OF ANTHRAQUINONE SULFONIC ACID COMPOUNDS

Karl Maier and Julius Eisele, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany No Drawing. Application January 20, 1956
Serial No. 560,279

Claims priority, application Germany January 22, 1955

5 Claims. (Cl. 260—367)

This invention relates to dyestuffs of the anthraquinone series and in particular to dyestuffs which are salts resulting from the reaction between sulfonic acids of the anthraquinone series and organic nitrogen bases.

We have found that very valuable dyestuffs are obtained by neutralizing sulfonic acids of the anthraquinone series having the general formula

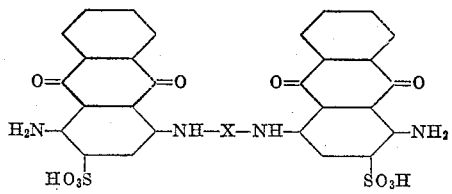

wherein X represents a bivalent organic radical derived from a bicyclic compound such as diphenylmethane or 2.2-diphenylpropane joined in the p- and p'-positions of the benzene nuclei with the NH-groups of the anthraquinone radicals, which may contain substantially neutral ring substituents such as lower alkyl or lower alkoxy groups or halogen atoms in their meta or ortho positions, with about the equivalent amount of organic nitrogenous mono- or polyvalent bases. By the equivalent amount is meant two molecular base equivalents of the base for each molecular equivalent of anthraquinone derivative, having two sulfonic acid groups.

Sulfonic acids of the anthraquinone series represented by the above general formula can be prepared by known methods, for example by reaction of 1-amino-4-bromantraquinone-2-sulfonic acid with diamines, such as bis-(p-aminophenyl)-methane or 2.2-bis-(p-aminophenyl)-propane, according to the process described in U.S. Patent No. 2,156,887.

Suitable mono- or polyvalent nitrogenous bases for the neutralization of the sulfonic acids of the anthraquinone series of the above mentioned general formula are polyamines, such as 1.6-hexamethylene diamine or bis-(p-aminocyclohexyl)-methane. The hydrogen atoms of the amino groups can also be replaced by alkyl radicals; for example the bis-(p-mono- and dimethylaminocyclohexyl)-methanes may also be used. By appropriate selection of the amino compounds it is possible to vary the tinctorial properties of the final dyestuffs.

The sulfonic acids of the anthraquinone series of the general formula mentioned above may be reacted in the form of the free acids or of their alkali metal salts, with the free amines or with their salts, for example their hydrohalides, in aqueous or aqueous-alcoholic solutions, advantageously at elevated temperature, preferably 70 to 100° C. Neither component need be used in excess. When the alkali salts of the sulfonic acids are used, the reaction proceeds more rapidly than when the free sulfonic acids are used as the latter are but poorly soluble in water. The preferred practice in reacting the free amines with the alkali salts of the sulfonic acids is to neutralize the hydroxyl ions formed by the addition of corresponding amounts of acids, such as hydrochloric acid. When starting from the salts of the amines, for example the hydrochlorides and the alkali metal salts of the sulfonic acids the resultant reaction products are almost completely free from the alkali salts which are products of the reaction.

The initial sulfonic acids of the anthraquinone series and their alkali metal salts are more or less soluble in water. On the contrary the final dyestuffs obtained according to this invention are difficultly soluble or insoluble in water. The dyestuffs obtained can in any case be purified by extracting them with boiling water. They dye both animal fibres, as for example wool or silk, and also fibres, foils or other shaped articles from polyamides, polyurethanes or casein, from neutral or weakly acid aqueous dispersions in good level shades which have good fastness properties, especially outstanding wet fastness properties. They are superior in their fastness properties to the initial sulfonic acids of the anthraquinone series which have not been reacted with amines, and, in addition, they have a clearer and more brilliant shade.

The following examples will further illustrate this invention but the invention is not restricted to these examples. The parts are parts by weight.

Example 1

5 parts of the sodium salt of the dyestuff obtained according to the said U.S. Patent No. 2,156,887 by condensing 2 mols of 1-amino-4-bromanthraquinone-2-sulfonic acid and 1 mol of bis-(p-aminophenyl)-methane are heated at 80 to 90° C. with 2.5 parts of bis-(p-dimethylaminocyclohexyl)-methane in 100 parts of a mixture of equal parts of methanol and water for about 2 hours while stirring on a waterbath. After distilling off the alcohol and neutralizing with dilute hydrochloric acid, the precipitated reaction product is extracted several times with boiling water. 6 parts of an insoluble dyestuff are obtained which dyes, for example, wool and polyamide fibres greenish blue shades of good fastness properties, especially of outstanding wet fastness properties which are superior to those of the dyeings obtained with the initial sulfonic acid which have not been reacted with an amine. The formula of the obtained dyestuff is:

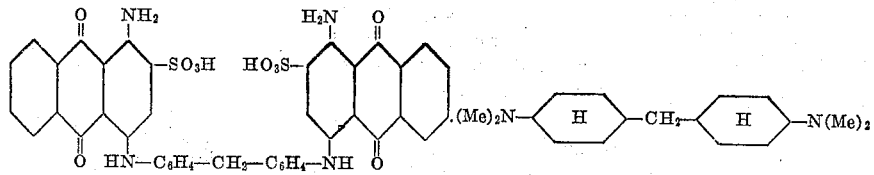

where Me represents a methyl group.

Example 2

5 parts of the initial dyestuff obtained by condensing 2 mols of 1-amino-4-bromanthraquinone-2-sulfonic acid with one mol of bis-(p-aminophenyl)-methane are stirred in 50 parts of a mixture of equal parts of methanol and water with 2.5 parts of bis-(p-aminocyclohexyl)-methane for about 1 hour while heating at 90° C. After distilling off the alcohol and neutralizing with dilute hydrochloric acid the reaction product is extracted several times with boiling water. 5 parts of an insoluble dyestuff are obtained which dyes, for example, wool and polyamide fibres greenish blue shades of good fastness properties, especially of outstanding wet fastness properties which are superior to those of the dyeings obtained with the initial sulfonic acid which have not been reacted with an amine.

The formula of the obtained dyestuff is:

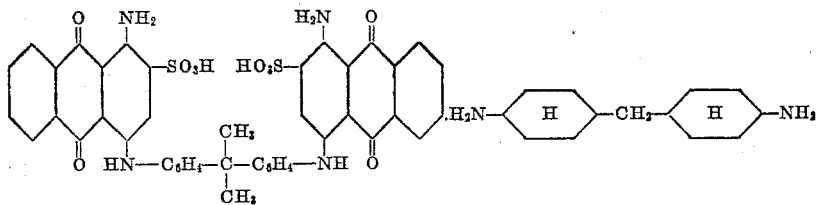

Example 3

47 parts of the sodium salt of 1-amino-4-bromanthraquinone-2-sulfonic acid, 10 parts of bis-(p-aminophenyl)-methane, 20 parts of anhydrous sodium carbonate and 2 parts of copper sulfate are heated in 800 parts of a mixture of equal parts of methanol and water for 24 hours at 75° C. while stirring. Then 20 parts of bis-(p-aminocyclohexyl)-methane are added thereto and the mixture is heated at 90° C. for about 1 hour further. After distilling off the alcohol and allowing to cool, the supernatant liquid is decanted off, and the remaining portion is stirred with several portions of water while heating and neutralized with dilute hydrochloric acid. The dyestuff, after filtration by suction and washing, is extracted several times with boiling water for the purpose of purification, the dyestuff being previously comminuted by grinding if desired. The yield amounts to 53 parts of the dyestuff obtained according to Example 2.

Example 4

3 parts of bis-(p-aminocyclohexyl)-methane, dissolved in a little alcohol, are added to a solution of 5 parts of the sodium salt of the dyestuff obtained by condensing 2 mols of 1-amino-4-bromanthraquinone-2-sulfonic acid and 1 mol of 2.2-bis-(p-aminophenyl)-propane in 250 parts of water. The whole is stirred for some time while being heated at 90° C. on the water bath and the excess of amine is neutralized with dilute hydrochloric acid. The precipitated dye salt is filtered off by suction and washed. 5.5 parts of dyestuff are obtained, the dyeings of which, for example on wool and polyamide fibres, show good fastness properties which are superior to those of the dyeings obtained with the initial sulfonic acid which have not been reacted with an amine.

The formula of the obtained dyestuff is:

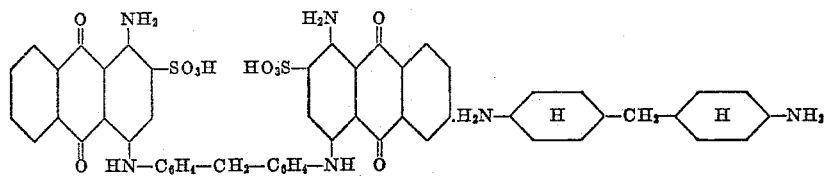

Example 5

5 parts of the dyestuff obtained by condensing 2 mols of 1-amino-4-bromanthraquinone-2-sulfonic acid and 1 mol of bis-(p-aminophenyl)-methane are dissolved in hot water and stirred at 90° C. with 1.5 parts of an aqueous 1.6-hexamethylene diamine solution the pH-value of which has been adjusted to about 6. A fine precipitate of an insoluble dyestuff salt is thus obtained. It is filtered off by suction, washed and extracted with boiling water. The yield amounts to 4.5 parts. The dyestuff gives blue dyeings of good fastness properties for example on wool and polyamide fibres which are superior to those of the dyeings obtained with the initial sulfonic acid which have not been reacted with an amine.

The formula of the obtained dyestuff is:

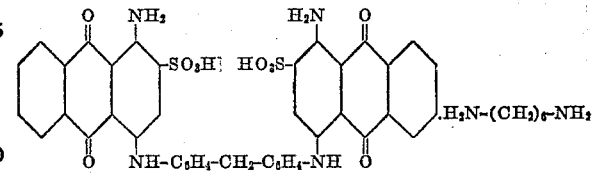

Example 6

A dilute solution of 2.5 parts of bis-(p-monomethylaminocyclohexyl)-methane in dilute hydrochloric acid which has a pH-value of about 6 to 7 is added to a solution of 10 parts of the dyestuff obtained by condensing 2 mols of 1-amino-4-bromanthraquinone-2-sulfonic acid and 1 mol of bis-(p-aminophenyl)-methane in hot water and the mixture is kept for about 1 hour at a temperature of about 90° C. while stirring. The precipitated reaction product is filtered off by suction, washed with hot water and again extracted with boiling water to which a small amount of the hydrochloric acid amine solution is added. 5.5 parts of an insoluble dyestuff are obtained which dyes, for example, wool or polyamide fibres greenish blue shades of good fastness properties which are superior to those of the dyeings obtained with the initial sulfonic acid which have not been reacted with an amine.

Example 7

100 parts of polyamide fibres for example condensation products of hexamethylene diamine adipate or condensation products of E-amino caprolactame, are dyed at 98° to 100° C. for 60 minutes in a bath of 1 part of the dyestuff prepared according to Example 2 or 3, 4 parts of 30 percent ammonia, 4 parts of ammonium sulfate and 4 parts of the hydroxyethylation product of 1 mol of sperm oil alcohol and 24 mols of ethylene oxide in 2000 parts of water. A pure blue dyeing is obtained having very good light and wet fastness properties which are superior to those of the dyeing obtained with the initial dyestuff of Examples 2 and 3.

Example 8

100 parts of a polyamide fabric for example condensation products of hexamethylene diamine adipate or condensation products of E-amino caprolactame, are dyed for 30 minutes at 95° to 100° C. in a bath containing 2 parts of the dyestuff according to Example 5, 10 parts of 30 percent ammonia and 10 parts of the hydroxyethylation product of 1 mol of octadecanol and 25 mols of ethylene oxide. 10 parts of ammonium sulfate are then added and the whole dyed for another 45 minutes at boiling temperature. A pure blue dyeing is obtained having very good fastness properties, especially outstanding wet fastness properties which are better than those of the dyeings obtained with the initial dyestuff of Example 5.

What we claim is:

1. Anthraquinone dyestuffs of the general formula

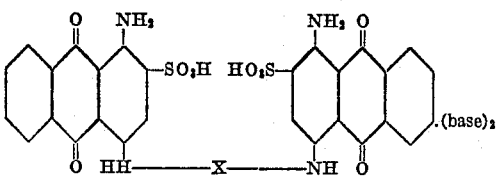

wherein X represents a bivalent radical selected from the group consisting of diphenyl methane and 2.2-diphenyl-propane joined in the p- and p'- positions of the benzene nuclei with the NH- groups of the anthraquinone radicals, and (base)₂ represents an equivalent amount of a saturated diamine selected from the group consisting of bis-(p-aminocyclohexyl)-methane, bis-(p-monomethylaminocyclohexyl)-methane, bis-(p-dimethylaminocyclohexyl)-methane and 1.6-hexamethylene diamine.

2. The anthraquinone dyestuff of the formula

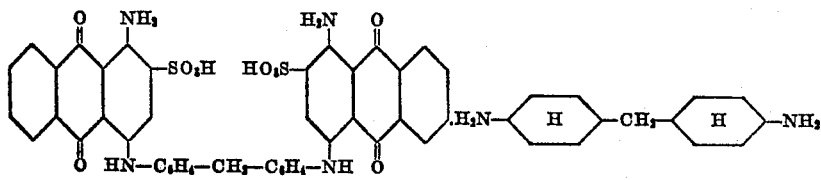

3. The anthraquinone dyestuff of the formula

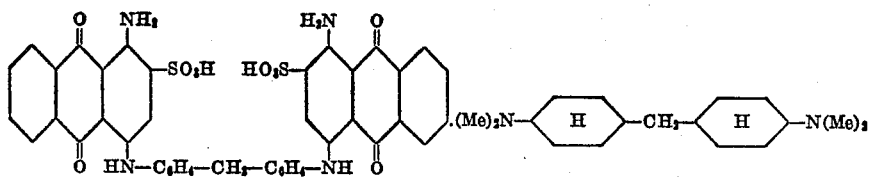

where Me represents a methyl group.

4. The anthraquinone dyestuff of the formula

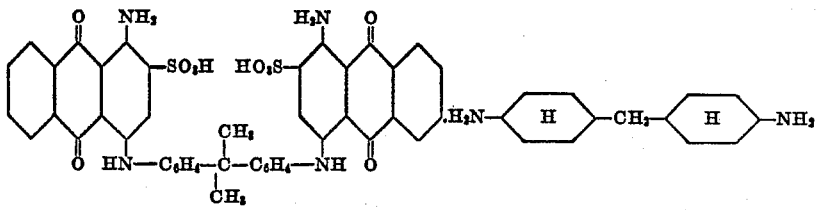

5. The anthraquinone dyestuff of the formula

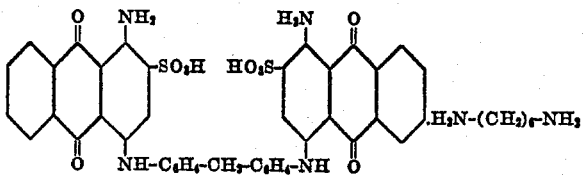

References Cited in the file of this patent

UNITED STATES PATENTS

| | | |
|---|---|---|
| 2,055,588 | Pospiech | Sept. 29, 1936 |
| 2,302,749 | Dean | Nov. 24, 1942 |
| 2,353,041 | Klein | July 4, 1944 |
| 2,705,717 | Oppliger | Apr. 5, 1955 |

UNITED STATES PATENT OFFICE
CERTIFICATE OF CORRECTION

Patent No. 2,913,465

November 17, 1959

Karl Maier et al.

It is hereby certified that error appears in the printed specification of the above numbered patent requiring correction and that the said Letters Patent should read as corrected below.

Column 6, lines 6 to 12, inclusive, the left-hand portion of the formula should appear as shown below instead of as in the patent:

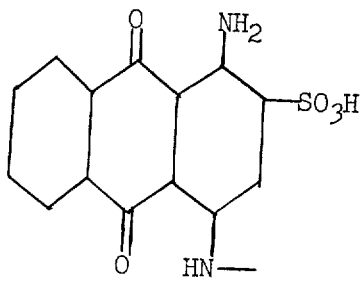

Signed and sealed this 7th day of June 1960.

(SEAL)
Attest:

KARL H. AXLINE
Attesting Officer

ROBERT C. WATSON
Commissioner of Patents